INVENTORS
REYNOLD B. JOHNSON
EDWARD F. GEIGER
BY Edward R. Lowndes
AGENT

INVENTORS
REYNOLD B. JOHNSON
EDWARD F. GEIGER
BY Edward R. Lowndes
AGENT

MASTER CLOCK

Filed Jan. 7, 1948

INVENTORS
REYNOLD B. JOHNSON
EDWARD F. GEIGER
BY Edward R. Lowndes
AGENT

MASTER CLOCK

Filed Jan. 7, 1948 4 Sheets-Sheet 4

INVENTORS
REYNOLD B. JOHNSON
EDWARD F. GEIGER
BY Edward R. Lowndes
AGENT

Patented Dec. 8, 1953

2,661,590

UNITED STATES PATENT OFFICE 2,661,590

MASTER CLOCK

Reynold B. Johnson and Edward F. Geiger, Binghamton, N. Y., assignors to International Business Machines Corporation, New York, N. Y., a corporation of New York Application January 7, 1948, Serial No. 990

4 Claims. (Cl. 58—26)

The present invention relates to clock systems in general and in particular to improvements in the construction and operation of master clocks commonly used in connection with systems wherein a series of secondary clocks is automatically synchronized with the master clock at regular intervals of time.

Specifically, the invention relates to a master clock which operates to send electrical impulses at regular intervals of time to all of the secondary clocks associated therewith in the system and each secondary clock is advanced a predetermined amount upon receiving each impulse. In addition to this, the master clock during certain predetermined intervals of time automatically regulates and effects synchronization with the master clock of any of the secondary clocks which may be fast or slow. An example of a master clock and an explanation of how such a clock functions in a clock system are fully disclosed in the U. S. patent to Larrabee, No. 1,878,931, dated September 20, 1932.

Heretofore, master clocks of the type briefly outlined above have been driven either by a synchronous electric motor operated by current flow from the commercial light and power line or they received their power from a spring-wound motor. Additionally, it has been proposed that where the master clock is normally driven by a synchronous electric motor operated from the power line that a standby or auxiliary motor be provided to operate and drive the time indicating element at the correct time rate in case the synchronous motor fails to operate effectively. An example of this latter type of master clock is shown in the U. S. patent to Rast, No. 2,424,119, dated July 15, 1947.

The present invention is designed as an improvement over the master clocks shown and described in the above mentioned patents and, toward this end, it is among the principal objects of the invention to provide a master clock, usable in systems of the type outlined above, and having associated therewith a moving element which is continuously driven from a spring-wound motor and another moving element which moves in synchronism with a source of current supply, which may be the usual 60-cycle current flow derived from a commercial light and power line, together with automatic means for regulating the rate of rotation of the continuously moving element to coincide with the rate of rotation of the synchronously moving element to the end that the rate of rotation of both of these elements shall be made the same. It is thus obvious that in case of a power line failure which brings the synchronously moving element to rest, the continuously rotating element will continue to move at the same rate as the synchronously moving element, thereby bridging over the hiatus during which there is no current supply.

A further and related object of the invention is to provide regulating mechanism for performing the functions briefly outlined above which will remain in effect only during such time as both the continuously moving spring driven element and the synchronously driven element are both in operation and which will become automatically inoperable in the event that the synchronously driven element comes to rest. It follows, therefore, that at the precise instant of a power failure the regulating mechanism will have brought the continuously rotating element into exact synchronism with the synchronously driven element so that the former will tide the master clock over, so to speak, until such time as power is resumed and that if the hiatus exists over a comparatively long period of time so that a discrepancy between the rate of rotation of the continuously driven element and of the synchronously driven element exists when power is resumed, suitable correction will be instantly and automatically made when such power resumption occurs.

The mechanical details and the features of construction which are necessary to provide an operative structure capable of functioning in keeping with the above mentioned objects are such that in the event the spring driven element becomes stalled for any reason whatsoever, the regulating means will attempt to bring the stalled element into synchronism with the synchronously driven element. Since the spring driven element is stalled and cannot be brought into such synchronism as long as it is stalled, the regulating means will move to the limit of its position for a fast setting of the spring driven element. The present construction is so designed that in such an event when an operator again restores or sets the spring driven element into motion the regulating means will immediately become effective to synchronize the two moving elements without further attention on the part of the operator.

It has been the practice, heretofore, to equip master clocks with certain contacts that cooperate with the clock movements to send impulses of electric current to the secondary clocks at regular periods of time for the purpose of driving the secondary clocks and also to equip the master clocks with additional contacts for sending rapid impulses of current during the synchronization period to any of the secondary clocks which may happen to be slow at the commencement of the synchronization period. An example of a complete master and secondary clock system may be had by reference to the U. S. patent to Bryce, No. 1,687,491, dated October 16, 1928, for a Synchronizing Clock. Additionally, other contacts are sometimes employed in connection with the master clocks for operating program devices or other auxiliary equipment from the master clocks. Such contacts have usually been cam operated from the gearing of the clock train of the master clock and the rapid impulse contacts have usually been operated from the verge or escapement mechanism of the master clock, all of the contacts in combination placing a relatively heavy drain or torque upon the verge shaft or other clock escapement mechanism. In accordance with the present invention, it is an object thereof to alleviate this relatively heavy drain on the clock system by removing the rapid impulse contacts from any association whatsoever with the spring driven clock mechanism and transferring the same to the driven mechanism associated with the synchronously driven element. Such a transfer presents no obstacle to the proper operation of the secondary clocks associated with the master clock inasmuch as when the current supply is unavailable for driving the synchronous motor, it is also unavailable for sending rapid impulses to the secondary clocks and, in any event, during current interruption, the secondary clocks must await their correcting impulses until such time as current is available for the rapid impulse contacts.

The provision of a master clock possessing the novel features briefly outlined above being the principal object of the invention, other objects of the invention will be pointed out in the following description and claims and illustrated in the accompanying drawings, which disclose, by way of example, the principle of the invention and the best mode, which has been contemplated, of applying that principle.

In the drawings.

In all of the above described views like characters of reference are employed to designate like parts throughout.

Figure 1:
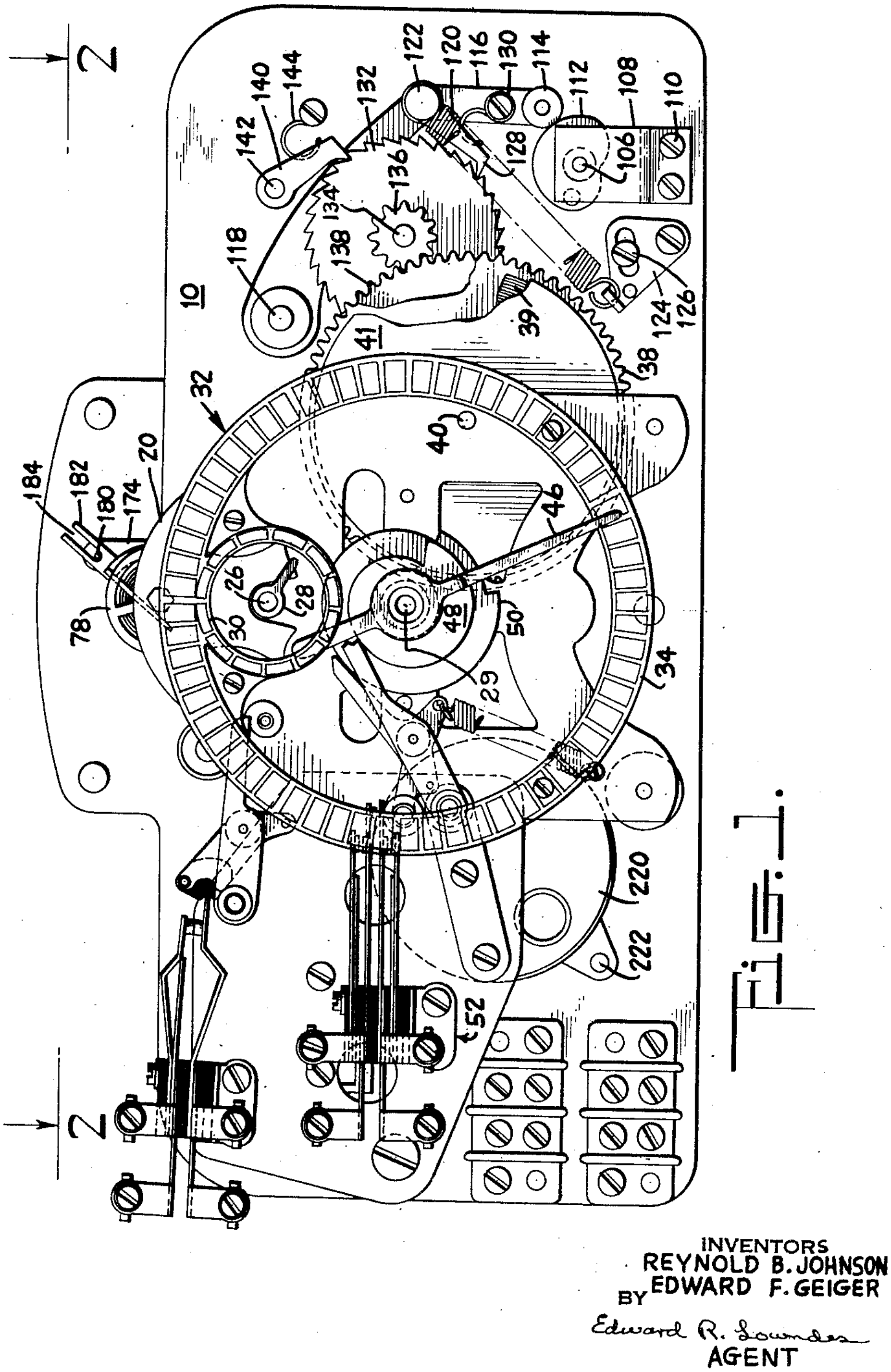
Fig. 1 is a front elevational view of a master clock constructed in accordance with the principles of the present invention.

Referring now to the drawings in detail, the master clock involves in its general organization a rear or main supporting plate or casting 10 from which all of the various stationary and moving parts of the clock structure are supported. This casting 10 is of irregular configuration and includes a substantially flat sheet-like forward section 12 and a rearwardly offset section 14, the latter being formed with rearwardly extending tapped and threaded attachment lugs 16 by means of which the casting 10 may be secured to a supporting surface or the like, not shown. A more or less conventional spring wound clock escapement mechanism is designated in its entirety as an assembly at 18 and includes a front support plate 20 and a rear support plate 22, the two plates being held in fixed spaced relationship by the usual pillars 24. The clock mechanism 18 comprises a time indicating train which consists of a driven shaft 26 supported for rotation between the two plates 20 and 22. As will be explained hereinafter, the driven shaft 26 is adapted to be rotated by the clock escapement mechanism once every minute and, as a consequence, this shaft constitutes the second hand shaft of the clock mechanism 18. Toward this end, it has mounted thereon, outside of the front plate 20, a second hand 28 which registers with a seconds indicating dial face 30 associated with an integral dial assembly plate 32. The dial assembly plate 32 also has associated therewith a minutes indicating dial face 34, the assembly 32 being of ring-like design and being secured to the front plate 20 forwardly thereof by means of pillars 36. The gear train for the clock mechanism 18 comprises a large first gear 38 which is loosely mounted on a power shaft 40 and which is attached adjacent its peripheral regions to the outer end of a coiled spring 39 disposed within a winding drum 41. The other or inner end of the coiled spring 39 is suitably secured to the power shaft 40 and the latter shaft is adapted to be periodically indexed or rotated throughout a small increment of motion to apply a tension to the coiled spring 39 and thus bias the first gear 38 for proper operation of the gear train of the spring wound clock mechanism. The first gear 38 meshes with a small second gear 42 mounted on a shaft 44 rotatably journaled between the front and rear plates 20, 22. The shaft 44 is adapted to be rotated under the influence of the coiled spring 39 and also under the control of an escapement mechanism, subsequently to be described, once every hour and, as a consequence, this shaft constitutes the minute shaft of the clock mechanism 18. Toward this end, it has mounted on one end thereof forwardly of the plate 20 a minute hand 46 which cooperates with the minutes indicating dial face 34. The minute hand 46 forms one element of a cam assembly including cams 48 and 50 associated with a synchronizing contact group designated in its entirety at 52, the nature and function of which will be made clear subsequently. The cam assembly is loosely disposed on the forward end of the minutes shaft 29 and is adapted to be frictionally driven from the latter shaft by means of a three-armed spring element 54 suitably secured to the shaft and the arms of which bear against the inner surface of the assembly.

A large third gear 56 is mounted on the minute hand shaft 44 and meshes with a small fourth gear 58 mounted on a shaft 60 journaled in the front and rear plates 20, 22. The shaft 60, as will appear presently, is adapted to be rotated once every seven and one-half minutes or to make eight revolutions per hour. To control such movement of the shaft 60, this shaft carries a large gear 62 which meshes with a small gear 64 mounted on the minute hand shaft 44 and this latter shaft 44 carries a large gear 66 which meshes with a small gear 68 mounted on the escapement wheel shaft 70 of the clock mechanism 18. The shaft 70 is rotatably journaled between the front and rear plates 20, 22 and carries an escapement wheel 72 which cooperates with the pallet surfaces on the usual verge element 74 mounted on the verge shaft 75 and associated with the escapement assembly. This latter assembly includes a conventional fork member 76 mounted on the verge shaft 75, a balance wheel 78, a balance shaft 80 and a hair spring 82.

An auxiliary seconds shaft 84 is journaled between the front and rear plates 20, 22 and carries a small gear 86 which meshes with the large gear 62. As the name implies, this latter seconds shaft is adapted to be rotated once every minute.

The auxiliary seconds shaft 84 has mounted thereon a pair of cams jointly designated at 88 and a second cam 90, the cams 88 serving to operate a contact group assembly 92 and the cam 90 serving to operate a contact group 94. The contact group assembly 92 is provided for the purpose of controlling the sending of electrical impulses to a suitable program device, not shown, and the contact group 94 is provided for the purpose of sending minute impulses to a series of secondary clocks (not shown). The nature and the specific use of the contact group assemblies 52, 92 and 94 form no part of the present invention, similar contact groups being shown in the above mentioned patent to Rast and reference may be had to this patent for a full disclosure of the manner in which such contact groups are actuated by rotation of the minute shaft of a clock mechanism similar to that shown herein. Furthermore, for an understanding of the electrical circuits which operate under the control of these contacts for the purpose of synchronizing a series of secondary clocks with a master clock, reference may be had to the above mentioned patent to Larrabee.

The power shaft 40 is adapted to be periodically impulsed or rotated throughout a small increment of motion to maintain the spring 39 of the drum assembly 41 wound and, toward this end, a synchronous electric motor 100, which is bolted as at 104 to the casting 10 at the rear side thereof, is provided with a motor shaft 106, the forward end of which is rotatably journaled in a bracket 108 secured as at 110 to the forward face of the casting 10. The motor shaft 106 carries thereon a cam 112, hereinafter referred to as the spring motor winding cam. The cam 112 is designed for cooperation with a follower roller 114 carried at the free end of an elongated lever 116 which is pivoted as at 118 to the front face of the casting 10. A coil spring 120 anchored at one end to a stud 122 carried medially of the lever 116 has its other end secured to a bracket 124, which is adjustably secured as at 126 to the casting 10. The spring 120 thus normally biases the follower roller 114 into engagement with the winding cam 112. An actuating pawl 128 is pivoted on the stud 122 and is spring pressed as at 130 into engagement with the peripheral teeth of a ratchet wheel 132 rotatably journaled on a stud 134 which projects forwardly from the casting 10. The ratchet wheel 132 has integrally formed thereon a small gear 136 which meshes with the circumferential teeth formed on a large gear 138 mounted on and secured to the power shaft 40. A holding pawl 140 is pivoted on a stud 142 carried by the casting 10 and is spring pressed as at 144 for cooperation with the ratchet wheel 132.

The shaft 106 is adapted to be continuously rotated once every minute under the influence of the motor 102 and, as a consequence, by virtue of the follower roller 114 which bears against the cam 112, the lever 116 is moved in a counter-clockwise direction when the follower roller 114 moves outwardly on the high region of the cam. As the follower moves inwardly approaching a low region of the cam, the pawl 128 is caused to rotate the ratchet wheel 132 in a clockwise direction throughout a small increment of motion to impart motion through the train of gears 136, 138, to the power shaft 40. As explained in the previously mentioned patent to Rast, the spring 120 is of such a nature that after a predetermined amount of winding of the spring 39 a condition of balance will exist between these two springs so that the torque applied by the pawl 140 to the ratchet wheel 132 will fail to move the latter and the follower roller 114 will be maintained out of engagement with the cam 112 until such time as the condition of balance no longer exists, thus preventing overwinding of the spring 39.

Figure 2:
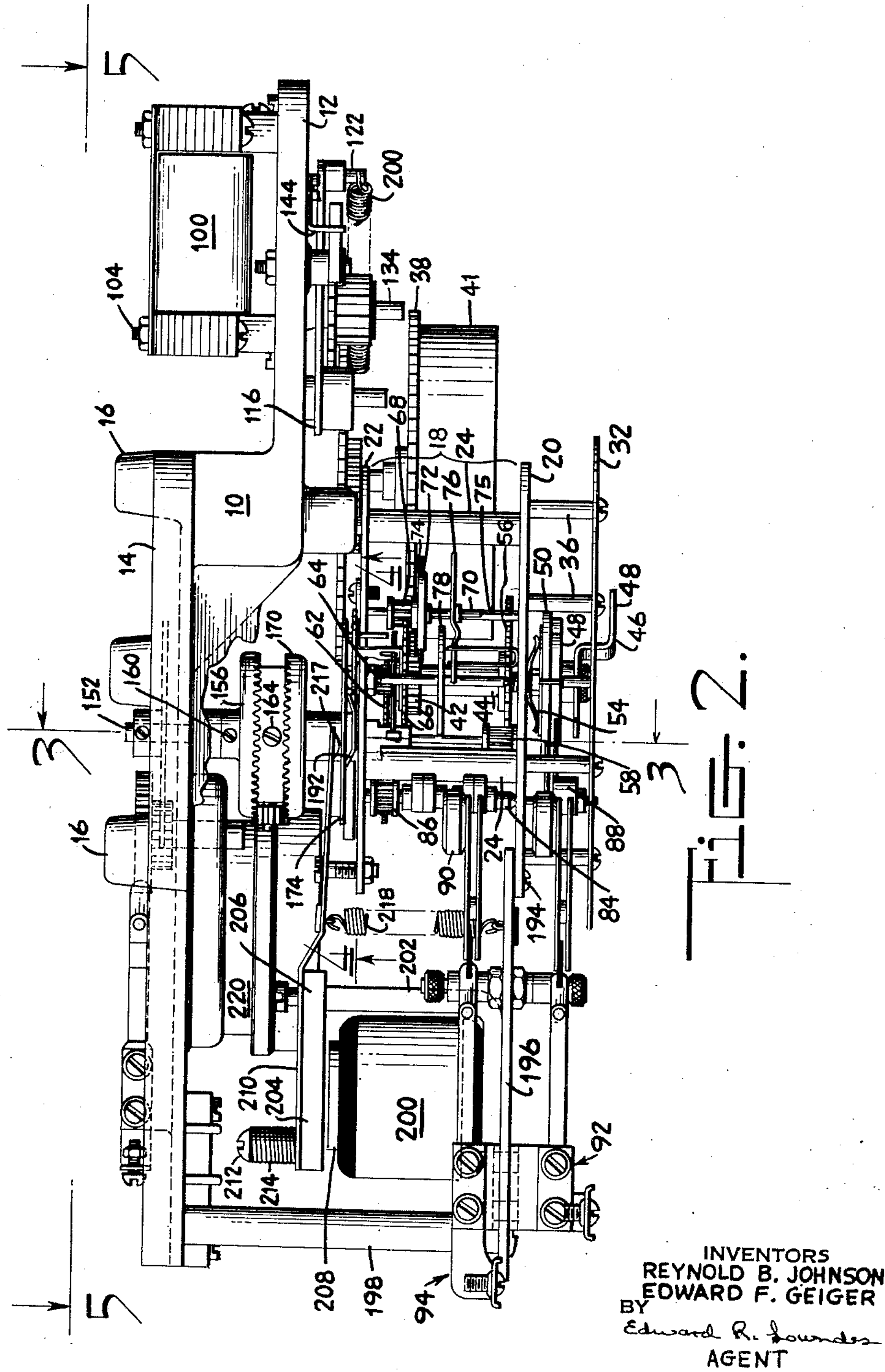
Fig. 2 is a top plan view of the clock shown in Fig. 1.
Figure 3:
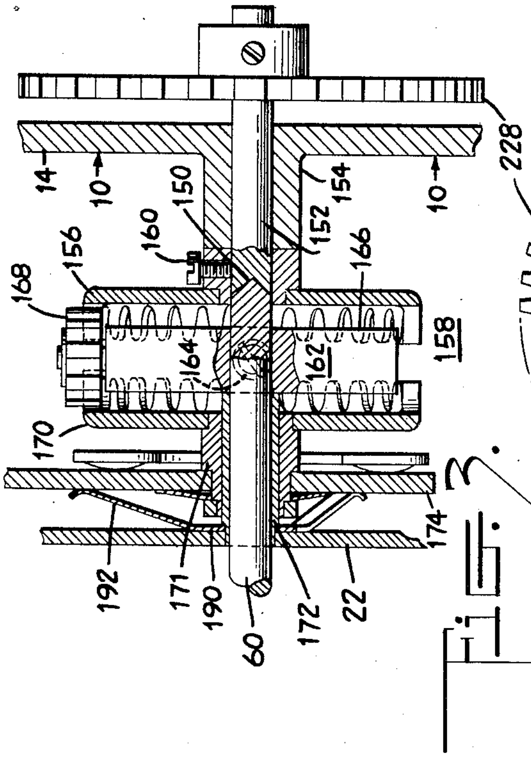
Fig. 3 is a sectional view taken substantially along the line 3—3 of Fig. 2 in the direction indicated by the arrows.

Referring now to Figs. 2 and 3, the shaft 60 projects rearwardly of the rear plate 22 and has its extreme rear end seated within a socket 150 formed in a shaft 152 rotatably journaled in the rearwardly offset portion 14 of the casting 10, the socket 150 thus serving to lend support to the rear end of the shaft 60. The shaft 152 extends through a boss 154 formed on the casting 10. One input or sun element 156 of a differential assembly designated in its entirety by 158 is mounted upon and secured to the shaft 152 forwardly of the casting 10. This input element 156 is in the form of a cup-shaped gear which is anchored to the shaft 152 by means of a set screw 160. The other input element of the differential assembly 158 is in the form of a planet member 162 which is secured by means of a set screw 164 to the shaft 60 and is adapted to rotate therewith. The planet member per se is in the form of a rectangular block 166 having a planet gear 168 journaled at one end thereof and in constant mesh with the teeth formed on the cup-shaped gear 156. The output element of the differential 158 is in the form of a gear 170 similar to the gear 156, this gear being mounted upon and secured to a sleeve 171 slidably and rotatably disposed upon a stationary bushing 172, the latter having one end thereof anchored in the rear plate 22. The shaft 60 extends completely through the stationary bushing 172 and projects into the socket 150 of the shaft 152, as previously described. The bushing extends between the planet member 162 and the outside face of the rear plate 22 of the clock mechanism 18.

Figure 4:
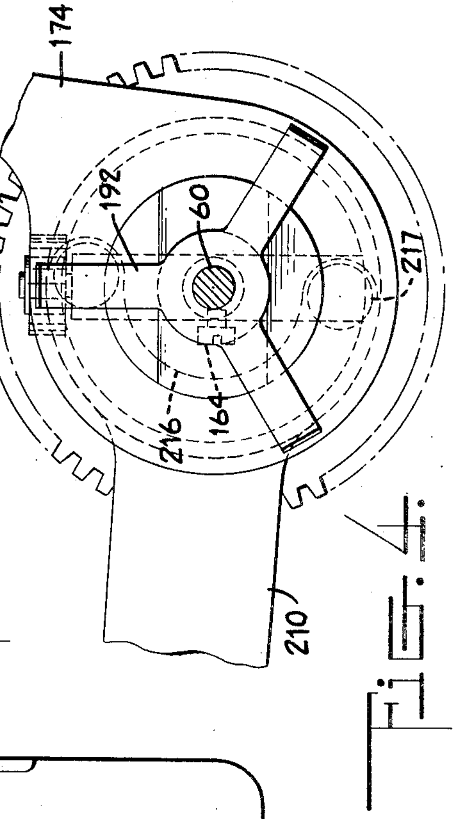
Fig. 4 is a sectional view taken substantially along the line 4—4 of Fig. 2 in the direction indicated by the arrows.

A regulator control arm 174 (see Figs. 3, 4 and 6) is mounted on and secured to the sleeve 171 and, consequently, is movable with the gear 170 and includes a hub portion 176 and an upwardly projecting arm portion 178 having a pin 180 secured to its free end and projecting forwardly of the clock mechanism 18. A regulating arm 182 is pivotally secured to the rear plate 22 and is provided with a bifurcated end 184 which straddles the regulating pin 180. The regulating arm 182 is provided with a forwardly extending bifurcated spring adjustment arm 186 which straddles the hair spring 82 near its point of support and is adapted upon angular movement to vary the effective length of the hair spring 82 and thus regulate the speed of operation of the escapement mechanism as is the universal practice in connection with most clock escapement mechanisms. The weight of the arm 178, pin 180 and arm 186 is offset by means of a counterbalance 188 secured to the hub portion 176 of the regulator control arm 174.

A spring element in the form of a spider 190 surrounds the bushing 172 and is provided with a plurality of spring arms 192 which bear against the front surface of the adjustment arm 174 with the rear portion or hub thereof bearing against the rear plate 22 of the clock mechanism, thus normally tending to urge the arm and gear assembly 174, 171, 170 rearwardly to cause the teeth on the cup-shaped gear 170 to engage the planet gear 168 associated with the planet element 162.

Referring now to Fig. 2, the front plate 20 of the clock mechanism 18 has bolted or otherwise secured thereto as at 194 a magnet supporting plate 196, the outer end of this plate being maintained in fixed spaced relationship from the rearward offset portion 14 of the casting 10 by means of a pillar 198. The plate 196 constitutes a support for the previously mentioned contact assemblies 92, 94 and it also constitutes a support for a magnet designated in its entirety at 200.

The magnet 200 involves in its general organization an L-shaped bracket 202, one arm of which is secured to the plate 196 and the other arm of which pivotally carries at its free end the armature 204 of the magnet 200, the pivotal connection existing by virtue of a pin and slot connection 206. The magnet core is designated at 208. A forked member 210 is secured in face-to-face relationship on the armature 204 and such face-to-face contact is maintained by means of a stud 212 and coil spring 214 which surrounds the stud and bears at one end against the head of the stud and at the other end directly against the forked member 210. The free end of the forked member 210 is bifurcated as at 216 (Fig. 4) and each furcation thereof is formed with a protuberance 217 which is adapted to bear against the side of the adjustment arm 174 opposite the spring spider 192. A coil spring 218 is secured at one end to a medial point on the forked member 210 and has its other end anchored to the plate 196. The spring 218 is relatively heavy and the tension thereof when in position is such as to normally overcome the tension of the spring spider 192 and thus draw the arm and gear assembly 174, 171, 170 forwardly and cause disengagement of the gear 170 from the planet gear 168.

From the above description of parts it will be seen that upon energization of the magnet 200, the armature 204 will be attracted so that it will pivot in a counterclockwise direction, as viewed in Fig. 2, about its pivotal point of connection with the bracket 202 to relieve the overbalancing tension on the spring spider 192 and permit the latter to force the arm and gear assembly 174, 171, 170 rearwardly and thus cause engagement of the gear 170 with the planet gear 168.

As previously set forth, the yoke or planet member 162 constitutes a spring driven input element for the differential assembly 158. The other input element for this differential assembly is in the form of the cup-shaped gear 156, while the output element of the assembly 158 is in the form of the cup-shaped gear 170 whose movement controls the regulator adjustment for the escapement mechanism. The input gear 156 is adapted to be continuously driven through a train of gears that derive their motion from a synchronous motor 220 which is bolted as at 222 to the casting 10. The motor 220 is provided with a drive shaft 224 (Fig. 5) which projects through the casting 10 and has mounted thereon a small gear 226 which meshes with a large gear 228 mounted on the shaft 152 which is rotatably journaled in the boss 154 formed in the casting 10. On the opposite side of the casting, the shaft 152 has mounted thereon the cup-shaped gear 156 which constitutes an input element of the differential assembly 158.

Figures 6, 7:
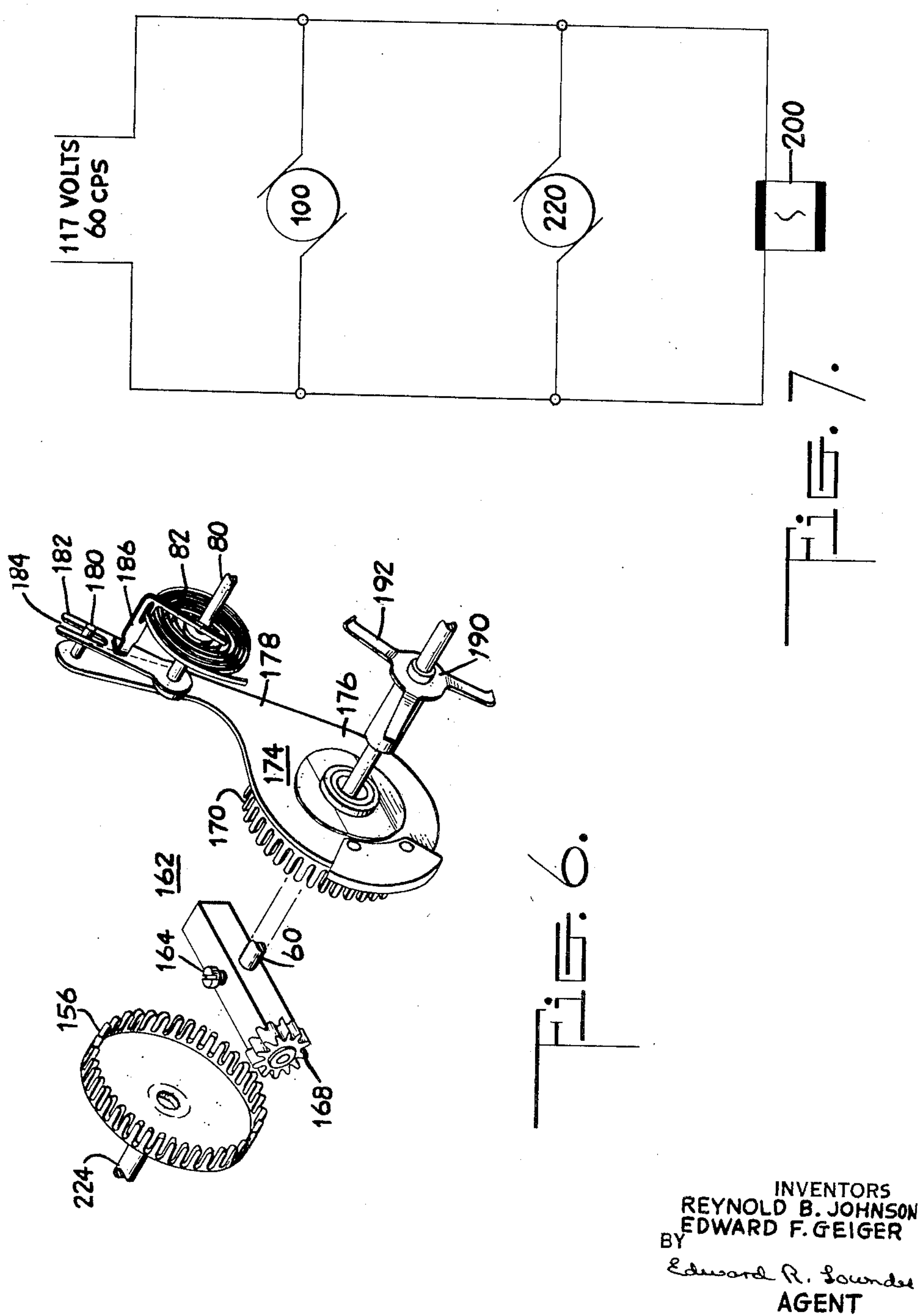
Fig. 6 is a fragmentary exploded view showing a portion of the clock mechanism including a differential gear assembly and a regulator arm employed in connection with the present invention.
Fig. 7 is an electrical circuit diagram for the master clock.

The synchronous electric motor 220 is adapted to be connected to the commercial 60-cycle power line (Fig. 7) and the train of gearing 226, 228, which derives its motion from this motor, is so calculated according to engineering exigencies that the shaft 224 and, consequently, the output gear 170 of the differential assembly 158 rotates eight times each hour or, in other words, it rotates once every seven and one-half minutes in a clockwise direction, as viewed in Fig. 6. The other input element of the differential assembly 158 is, as previously stated, in the form of the planet assembly 162. This latter assembly, being mounted upon and driven by the shaft 60, is rotated under the control of the spring wound motor escapement mechanism and the regulator arm 178 is adapted to be so positioned that the planet assembly makes one complete counter-clockwise revolution during the course of each seven and one-half minutes.

It will be appreciated that, because of the fact that the planet gear 168 is in constant mesh with the teeth on the input gear 156 and because of the fact that the planet body 166 and gear 156 are intended to rotate in opposite directions at exactly the same rate of turning movement, the planet gear 168 will "walk," so to speak, around the circular path provided by the teeth on the gear 156 in such a manner that there is no tendency for the teeth on the planet gear 168 to impart motion in either direction to the output gear 170 when the latter is held in mesh therewith under the influence of the electromagnet 200 and its armature 204. This statement holds good, of course, only when the synchronous motor 220 is energized and in operation concurrently with the operation of the escapement mechanism to control the rotation of the shaft 60 at the predetermined rate of speed. It may be assumed that the source of alternating current is properly regulated at the commercial power house to generate exactly 60-cycles per minute and in the event that the escapement mechanism is improperly adjusted, as for example, to rotate the shaft 60 at a higher rate of speed than once every seven and one-half minutes and thus cause the master clock to run fast, the planet assembly 162 will tend to rotate in a counter-clockwise direction, as viewed in Fig. 6, at a greater rate of speed than the input gear 156 which rotates in the opposite direction. As a consequence of this, the teeth on the planet gear 162 will impart a forward thrust on the output gear 170 tending to move the same in a counter-clockwise direction and thus, through the spring thrust element 190, impart a similar movement to the regulator arm 182. Such a movement of this latter arm will increase the effective length of the hair spring 82 and thus slow down the clock mechanism. It follows, conversely, that in the event the escapement mechanism is maladjusted so as to cause the clock mechanism to run slow, the planet assembly 162 will rotate in a counter-clockwise direction at a slower rate of speed than the input gear 156 will rotate in a clockwise direction. By virtue of this phenomenon, the planet gear 168 will walk around the circumferential path provided for it in such a manner that a back thrust will be applied to the output gear 170 which will tend to move the regulator arm 178 in a clockwise direction and thus gradually shorten the effective length of the hair spring to thereby quicken the oscillatory movement of the escapement wheel 78 and speed up the clock mechanism. Such movement of the regulating arm 178 continues until a degree of balance exists between the speed of the 60-cycle synchronous electric drive mechanism and the speed of the spring wound motor drive mechanism, at which time the master clock may be assumed to be operating at the proper rate of speed.

Referring now to Fig. 6, wherein a simple electrical circuit for the operation of the master clock is shown, it will be seen that the two synchronous motors 100 and 220, as well as the magnet 200, are all arranged in parallel with the source of 60-cycle alternating current so that in the event there is a power failure and current is interrupted all three of these elements become simultaneously deenergized, thus causing the motor 220 to stop and, as a consequence, the input gear 156 to cease its rotation. At the same time, the magnet 200 becomes deenergized and the armature 204 is released under the influence of the spring 218 so that the bifurcated arm 210 will draw the output gear 170 out of mesh with the planet gear 168 and prevent movement of the regulating arm 178 which would ordinarily occur in the event that these gears were allowed to remain in mesh after power failure. Upon subsequent restoration of the power supply, the magnet 200 again becomes energized and the output gear 170 and planet gear 168 are again thrown into mesh under the influence of the armature 204 and forked arm 210. Any discrepancy that may have arisen during the interim of power failure will then be automatically corrected by the differential assembly 158 in the manner previously described.

It should be noted that in the event of failure of the escapement mechanism of the master clock, as for example, due to the lodgement of lint or other foreign surfaces in the bearings or other parts of the clock mechanism, the synchronous motor will continue to rotate while the planet assembly 162 will remain stationary as far as its revolution about the axis of the shaft 60 is concerned. In such an event, the input gear 156 will rotate the planet gear in such a manner as to cause the output gear 170 to rotate in a clockwise direction, as viewed in Fig. 6, to bring the regulator arm 178 to the limit of its fast adjustment. The master clock will then be set for a fast adjustment and when the same is again started and the condition which caused its failure remedied by the operator, automatic readjustment of the regulator arm 178 will take place and there will be no need for the operator to effect manual adjustment of the regulator arm. It should be observed that during the period of idleness of the master clock after the regulator arm has reached the limit of its fast adjustment slippage will occur between the three-armed friction spring 190 and the forward surface of the regulator arm 178. At no time will the driving connection between the clock mechanism and the regulator arm 174 become disengaged and the operator will at all times be freed of any responsibility associated with the adjustment of the regulator arm.

Figure 5:
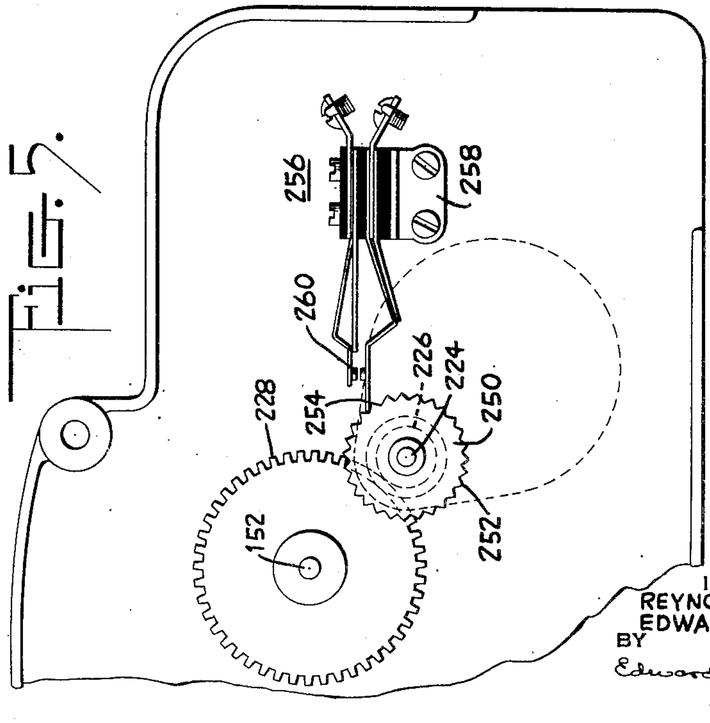
Fig. 5 is a fragmentary rear view of the structure shown in Figs. 1 and 2.

Referring now to Figs. 2 and 5, the drive shaft 224 of the synchronous motor 220 has mounted thereon a toothed disc 250 which is positioned on the shaft just outside the small driving gear 226 and the teeth 252 on this disc are designed for cooperation with an operating finger 254 forming part of a contact group assembly designated in its entirety at 256, this latter assembly being secured by means of a bracket 258 to the rear face of the casting 10. A pair of contacts 260 are associated with the assembly 256 and are adapted upon synchronous rotation of the disc 250 to become closed momentarily once every two seconds for the purpose of sending rapid impulses to a series of secondary clocks (not shown) associated with the master clock comprising the present invention during the synchronizing period in accordance with the principles set forth in the above mentioned patent to Bryce.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. In a clock system, a source of current supply, a synchronous motor rotating in timed relationship with said source, a differential assembly including a sun gear comprising one input element of the assembly, a planet gear in constant mesh with said sun gear and constituting another input element of the differential assembly and a second sun gear normally out of mesh with said planet gear and capable of being moved to a position wherein it is in engagement with said planet gear, said latter sun gear constituting the output element of said differential, means operatively connecting said synchronous motor to said first sun gear in driving relationship, a spring driven clock escapement mechanism including a driven shaft operatively connected to the planet gear for revolving the latter about the axis of said first sun gear in a direction whose effect on the second sun gear is opposed to the effect of said first sun gear, a regulating member for said clock escapement mechanism operatively connected thereto and movable in one direction to progressively lengthen the natural period of said escapement mechanism and movable in the other direction to shorten said period, the natural period of said escapement mechanism within its limits of adjustment being such as to cause said input elements to be driven at rates of speed wherein little or no motion is applied to said second sun gear, and means connecting said second sun gear and regulating member for imparting the movements of the former to the latter to thereby regulate the natural period of said escapement mechanism in accordance with the movement of said synchronous motor, an electromagnet operatively connected to said source of power and normally energized thereby, an armature for said electromagnet, means operatively connecting said armature and second sun gear and serving to maintain the latter in mesh with said planet gear when the electromagnet is energized.

2. In a clock system, a source of current supply, a synchronous motor rotating in timed relationship with said source, a differential assembly including a sun gear comprising one input element of the assembly, a planet gear in constant mesh with said sun gear and constituting another input element of the differential assembly and a second sun gear normally out of mesh with said planet gear and capable of being moved to a position wherein it is in engagement with said planet gear, said latter sun gear constituting the output element of said differential, means operatively connecting said synchronous motor to said first sun gear in driving relationship, a spring driven clock escapement mechanism including a driven shaft operatively connected to the planet gear for revolving the latter about the axis of said first sun gear in a direction whose effect on the second sun gear is opposed to the effect of said first sun gear, a regulating member for said clock escapement mechanism operatively connected thereto and movable in one direction to progressively lengthen the natural period of said escapement mechanism and movable in the other direction to shorten said period, the natural period of said escapement mechanism within its limits of adjustment being such as to cause said input elements to be driven at rates of speed wherein little or no motion is applied to said second sun gear, and means operatively connecting said second sun gear and regulating arm for imparting the movement of the former to the latter to thereby bring the natural period of said escapement mechanism into conformity with the rate of rotation of said synchronous motor, the said connecting means normally being yieldable with respect to the said gear and arm to permit reverse rotation therebetween, said connecting means yielding independently of the said gear and arm, an electromagnet operatively connected to said source of power and normally energized thereby, an armature for said electromagnet, means operatively connecting said armature and second sun gear and serving to maintain the latter in mesh with said planet gear when the electromagnet is energized.

3. In a clock system, a source of alternating current supply, a synchronous motor rotating in timed relationship with said source, a differential assembly including a pair of input elements and an output element whose movements are a differential function of said input elements, means operatively connecting said synchronous motor to one of said input elements in driving relationship, a spring driven clock escapement mechanism including a driven shaft operatively connected to the other input element of the differential assembly in driving relationship for driving the latter in a direction whose effect on the output element is opposed to the effect of said first input element, a regulating member for said clock escapement mechanism operatively connected thereto and movable from an advanced position to a retracted position for progressively lengthening the natural period of said escapement mechanism and movable in the other direction to shorten said period, the natural period of said escapement mechanism within its limits of adjustment by the regulating member being such as to cause said input elements to be driven at respective rates of speed closely approaching or equaling each other, regulating member driving means for adjusting said regulating member in accordance with the movements of the output element of said differential assembly, a slip clutch comprising a friction spring interposed between a stationary frame plate and said regulating member driving means adapted to provide both a yielding connection between said clock escapement mechanism and said synchronous motor at any time the clock escapement mechanism should become inoperative and also a driving connection between said output element of the differential assembly and said driving means for the regulating member at all times during simultaneous operation of both said clock escapement mechanism and said synchronous motor whereby the natural period of said escapement mechanism is regulated by the rate of speed of said synchronous motor under the control of said source of current supply, during simultaneous operation of the escapement mechanism and the motor.

4. In a clock system, a source of alternating current supply, a synchronous motor rotating in timed relationship with said source, a differential assembly including a pair of input elements and an output element whose movements are a differential function of said input elements, means operatively connecting said synchronous motor to one of said input elements in driving relationship, a spring driven clock escapement mechanism including a driven shaft operatively connected to the other input element of the differential assembly in driving relationship for driving the latter in a direction whose effect on the output element is opposed to the effect of said first input element, a regulating member for said clock escapement mechanism operatively connected thereto and movable from an advanced position to a retracted position for progressively lengthening the natural period of said escapement mechanism and movable in the other direction to shorten said period, the natural period of said escapement mechanism within its limits of adjustment by the regulating member being such as to cause said input elements to be driven at respective rates of speed closely approaching or equaling each other, and a safety mechanism for preventing damage to said clock escapement mechanism by said synchronous motor comprising means for driving said regulating member between fixed limits, a friction spring slip clutch member interposed between a stationary frame member and the driving means for said regulating member adapted to provide a driving connection for said regulating member within the limits of its adjustment and a yielding connection whenever the rate ratio between the clock escapement and the synchronous motor is such that the synchronous motor acts to drive the regulating member beyond either of its two extreme limits of adjustment, said safety mechanism normally permitting the differential assembly to impart to the regulating member rotational movements in either direction to advance or retard the same and to thereby regulate the natural period of said escapement mechanism in accordance with the frequency of the said source of current supply.

REYNOLD B. JOHNSON.
EDWARD F. GEIGER.

References Cited in the file of this patent

UNITED STATES PATENTS

| Number | Name | Date |
|---|---|---|
| 1,328,247 | Poole | Jan. 13, 1920 |
| 1,687,491 | Bryce | Oct. 16, 1928 |
| 1,878,931 | Larrabee | Sept. 20, 1932 |
| 2,424,119 | Rast | July 15, 1947 |